Oct. 29, 1946.  C. V. BERRY  2,410,327
MINIATURE CAMERA
Filed March 24, 1943  2 Sheets-Sheet 1
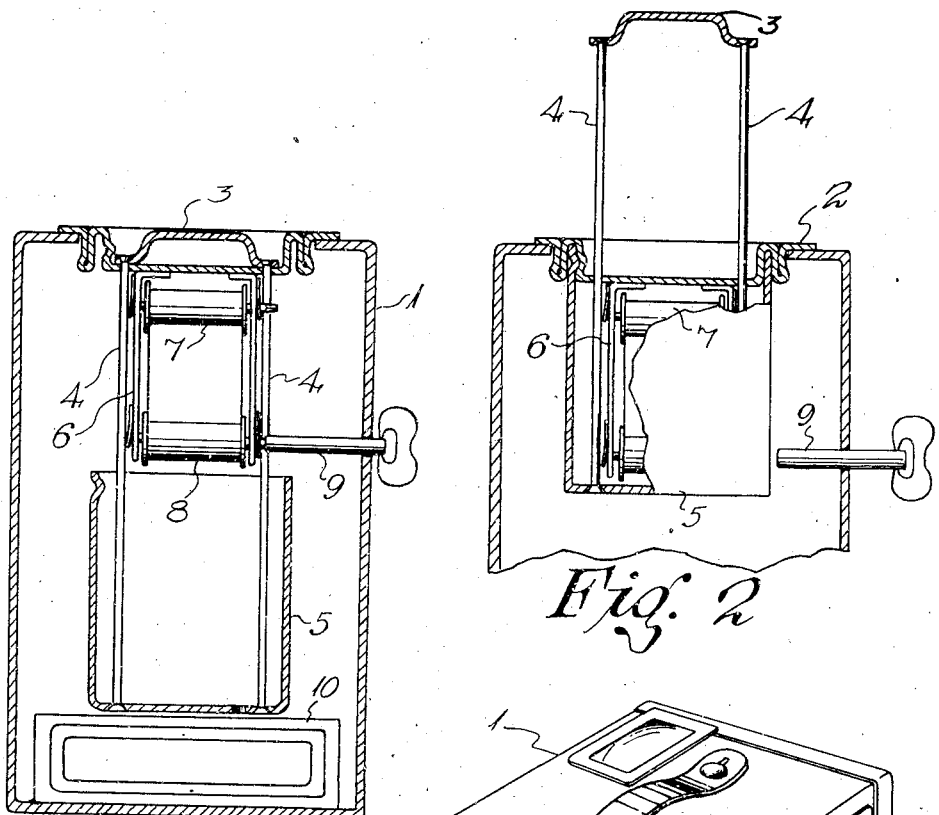
Figure 1
Fig. 2
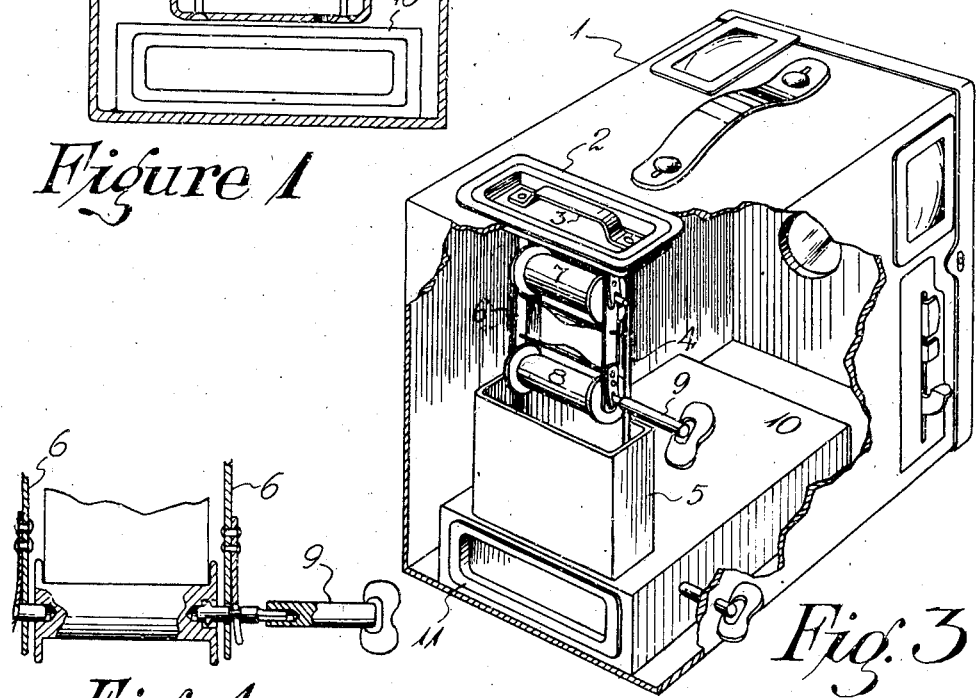
Fig. 4
Fig. 3
Inventor
Clifton V. Berry Oct. 29, 1946. C. V. BERRY 2,410,327
MINIATURE CAMERA
Filed March 24, 1943 2 Sheets-Sheet 2

Inventor
Clifton V. Berry.

Patented Oct. 29, 1946

2,410,327

UNITED STATES PATENT OFFICE 2,410,327

MINIATURE CAMERA

Clifton V. Berry, West Haven, Conn.

Application March 24, 1943, Serial No. 480,291

5 Claims. (Cl. 95—13)

This invention relates to cameras and it is one object of the invention to provide a camera having associated with it a developing tank in which a roll of film may be developed after being exposed, the developing being accomplished without use of a dark room.

Another object of the invention is to provide a camera wherein a developing tank is mounted within the box of the camera and has an entrance through which exposed film may be introduced into the tank when a cover or closure for the entrance is removed.

Another object of the invention is to provide a camera including a film holder of such formation that after a roll of film has been exposed for taking pictures the holder may be withdrawn from the box of the camera and then thrust into the developing tank.

Another object of the invention is to provide a shield which may be shifted from an extended position to a position in which it encloses the film holder and a roll of exposed film and very effectively prevents light from reaching the film while transfer of the film holder to the developing tank.

Another object of the invention is to so form the film holder that film may be fed in one direction when taking pictures and in an opposite direction while developing exposed film.

Another object of the invention is to provide a camera which includes in its construction the improved film holding and developing mechanism but is of such dimensions that it may be easily carried in a person's hand and operated in the usual manner without use of a tripod.

The invention is illustrated in the accompanying drawings wherein:

Fig. 1 is a sectional view taken vertically through a camera of the improved construction, the shield for the film being in an extended position permitting taking of pictures.

Fig. 2 is a sectional view taken vertically through the camera and showing the shield moved into position to enclose the film holder and exposed film carried thereby.

Fig. 3 is a perspective view of the improved camera with portions of the box broken away.

Fig. 4 is a fragmentary view showing the lower portion of the film holder in section and a key engaged with the lower roller.

Figure 5:
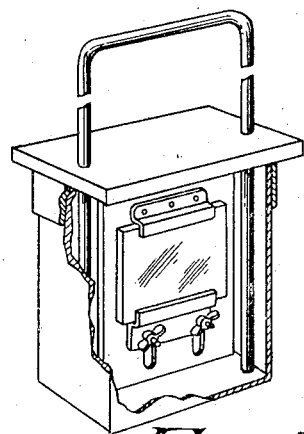
Fig. 5 is a perspective view showing a modified embodiment of the invention.

This improved camera has the usual box or casing 1 which may be of any size desired but is preferably of such size that it may be conveniently carried in a person's hand and snapshot pictures taken. The usual lens and shutter mechanism will be provided at the front of the box but have been omitted as they will be of conventional formation and form no part of the invention. An opening which extends transversely of the box is formed through the upper wall thereof near the rear end of the box and through this opening the film holding mechanism is thrust into the box and withdrawn therefrom.

This improved film holding mechanism includes a lid or cover 2 which is crimped to form a depending bead 2' spaced from its margins and of such dimensions that it will fit snugly in the opening in the top wall of the box. Since the lid is formed of resilient material, such as sheet metal, its bead or rib frictionally engages edges of the box about the opening and prevents the cover or lid from slipping outwardly and allowing light to enter the box about the cover. Openings are formed through the lid through the bottom of a depression or recess provided as a seat for a handle 3, and this handle carries rods 4 which extend downwardly from its ends and slidably pass through the openings in the cover. Lower ends of the rods are rigidly secured through the bottom of a cup-shaped shield 6 which has its walls extending upwardly from its bottom in spaced relation to the rods. By grasping the handle 3 and exerting upward pull the rods will be drawn upwardly through the cover 2 until the upper end of the shield engages the cover and the bead 2' fits tightly about the walls of the shield and forms a tight joint between the cover and the shield. Additional pull upon the handle will then withdraw the cover from the box.

Strips 6 extend downwardly from the cover and are formed with openings to rotatably receive the pintles 6a and 6b by means of which upper and lower film-spools 7 and 8 are removably mounted for rotary motion between the strips, the pintles 6b being engageable by keys 9 so that the spools may be turned and film transferred from one spool to the other. It will be understood that when the film is inserted for use it is wound upon the upper spool 7 and engaged with the lower spool so that it will be progressively transferred to the lower spool by turning the lower spool after exposures have been made. After all of the film has been exposed the key engaged with the lower spool is shifted outwardly and the handle 3 grasped and pulled upon to draw the rods 4 upwardly and shift the shield 6 and the film with the upper end of the shield overlapped by the bead 2' to form a tight joint and prevent light from entering the shield and ruining the film when the cover 2 is dislodged from the opening in the box and the shield and the enclosed film withdrawn from the box.

Figure 8:
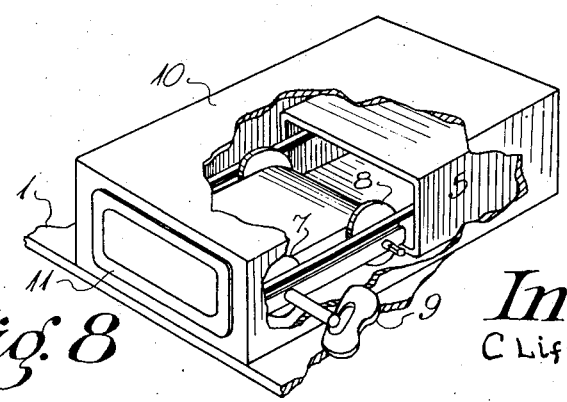
Fig. 8 is a perspective view of the developing tank, a portion of the same being broken away and showing the film holder in the tank.

The film is now to be immediately developed and in order to do so there has been provided a developing tank 10 which extends longitudinally in the box and is firmly mounted against the bottom of the box. An open outer end of the tank is exposed through the rear wall of the box and is normally closed by a door or cover 11. This door or cover fits tightly in the open end of the tank but may be easily removed when the tank is to be used. During use of the tank the camera is turned to dispose its rear wall uppermost and the cover 11 removed. The shield 4 and the enclosed film is then thrust into the tank and the cover 3 forced tightly into place to exclude light from the tank. The handle 3 is then thrust towards cover 3 to shift the rods 4 inwardly and move the shield inwardly from about the film and the strips to the position shown in Figure 8. The key 9 near the bottom of the box is then shifted inwardly to engage the pintle 6b engaged by the spool 7 and the key turn to rotate spool 7 and cause the film to be wound from spool 8 to spool 7. As the film moves from spool 8 to spool 7 it passes the developing fluid in the tank and the pictures will be developed. The cover 3 is then removed from the open end of the tank to withdraw the developed film and the shield and the spool of developed film removed from between the strips 6. A spool of new film will then be set in place between strips 6 and the film connected with the spool 8 and the film carrying mechanism and the lowered shield then thrust through the opening in the top wall of the box to dispose the film in position for taking pictures.

In Figure 5 there has been shown a modified embodiment of the invention wherein plates 12 are used instead of rolls of film. In this embodiment of the invention the plates are removably held against a panel 13 by clips 14, the panel being suspended under a cover 15. Openings are formed through the cover to receive the arms 16 of a handle 17 and lower ends of the arms are rigidly secured to the bottom of a cup-shaped shield 18 which encloses the panel and a plate when pull is exerted upon the handle to draw the shield upwardly to the shielding position and its upper end overlapped by the flange or rim 19 to exclude light from the shield.

Figure 6:
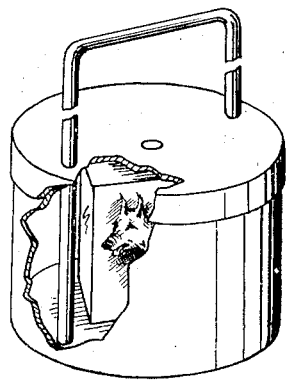
Fig. 6 is a perspective view of another modified embodiment of the invention.
Figure 7:
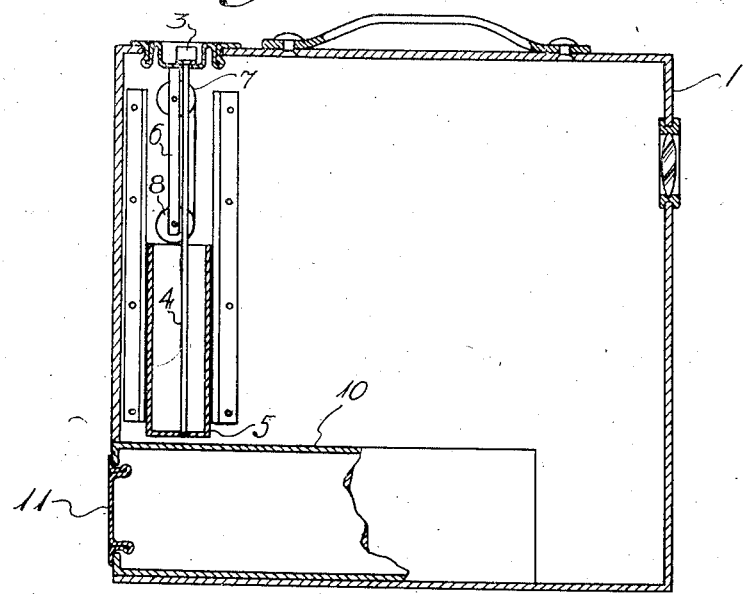
Fig. 7 is a sectional view taken longitudinally of the improved camera.

The device shown in Figure 6 is similar to that in Figure 5 but the shield 20 is cylindrical and the cover 21 and its depending flange 22 circular. The plate holder 23 is secured to the cover by a rivet 24 and so spaced from the margin of the cover that the arms 24 of the handle 25 will be disposed at opposite sides of the plate in such spaced relation to the plate holder that the shield may be drawn upwardly into position about the plate holder.

Having thus described the invention, what is claimed is:

1. In a camera, a box formed with an opening through the rear portion of its top wall, a removable cover for said opening having a depending flange fitting tightly in the opening, strips extending downwardly from said cover, upper and lower pintles carried by said strips for rotatably mounting film-spools between the strips, the pintles of one strip being rotatably mounted, a key rotatably mounted through a side wall of the box and engageable with the lower one of the rotatable pintles for rotating the lower spool to wind film thereon from the upper spool, a handle, rods extending downwardly from ends of said handle through said cover and of appreciably greater length than said strips, a cup-shaped shield rigidly secured to lower ends of said rods and disposed about the lower portions of the rods and located below said strips when the handle is disposed against the cover, said shield when shifted upwardly by a pull upon the handle being disposed about the strips in enclosing relation to the strips and spools of film between the strips and having its upper end overlapped by the flange and tightly gripped thereby to provide a tight closure for the open upper end of the shield and prevent entrance of light into the shield when the cover is removed from the box and the shield drawn outwardly through the opening, a developing tank in said box mounted upon the bottom of the box and having an open rear end exposed through the rear wall of the box, a removable closure for closing the rear end of the tank, the open rear end of the tank being of dimensions adapting the shield to be thrust into the tank through the open rear end thereof and the cover fitted tightly into the rear end of the tank and the handle forced towards the cover to shift the shield to its extended position beyond the free ends of the strips and expose the film to action of developing fluid in the tank, and a key mounted through the said side wall of the box for engaging the upper pintle and rotating the upper spool to rewind film upon the upper spool and move the film through developing fluid in the tank.

2. In a camera, a box having its top wall formed with an opening, a removable cover for said opening formed with a depending marginal flange passing through the opening, strips extending downwardly from end portions of said cover, upper and lower pintles carried by said strips for rotatably mounting upper and lower film-carrying spools between the strips, a handle, rods carried by and extending downwardly from end portions of said handles and slidably passing through end portions of said cover into the box with their inner end portions projecting the strips a distance equal to the length of the strips, a cup-shaped shield disposed about said rods with the rods entering the shield through the open upper end thereof and secured to the bottom of the shield, said shield when shifted upwardly by pull upon said handle being disposed in a retracted position enclosing the strips and spools of film between the strips and having its upper end surrounded by said flange and firmly gripped to exclude light from the interior of the shield when the cover is released and the shield and film enclosed thereby is withdrawn through the opening, and a key mounted through a side wall of the box for engaging a lower pintle and rotating the same to turn a spool between the lower pintles and wind film thereon as pictures are taken.

3. In a camera, a box having its top wall formed with an opening, a removable cover for the opening provided with a depending marginal flange passing through the opening, means extending downwardly from said cover for carrying sensitized picture-taking means and supporting the same in operative position in the box, a cup-shaped shield open at its top and of dimensions to enclose the supporting means, rods passing through said cover with their lower end portions extending longitudinally in said shield and rigidly secured at their lower ends to the bottom of the shield, and a handle fixed to upper ends of said rods outwardly of the cover in position to be grasped and pull exerted to draw the shield upwardly from a lowered position in which the flange fits tightly about the upper end of the shield for excluding light when the cover is dislodged and the shield drawn outwardly from the box.

4. In a camera, a box having its top wall formed with an opening, a removable cover for the opening provided with a depending marginal flange passing through the opening, supports extending downwardly from said cover for carrying film-holding spools, a shield open at its top, rods slidably passing through said cover and rigidly connected with said shield, a handle fixed to outer ends of said rods for shifting the rods longitudinally and moving the shield from a lowered position below the supports to a raised position in which the shield encloses the supports and said flange fits tightly about the upper end of the shield to exclude light when the cover is dislodged and the shield drawn outwardly through the opening, and means for turning spools and winding film from one spool to the other while said shield is in its lowered position.

5. In a camera, a box having a wall formed with an opening, a removable cover for said opening having a marginal flange extending through the opening, supporting means for film-spools carried by and extending inwardly from said cover, a shield for enclosing said supporting means open at one end, a handle normally disposed against the outer face of said cover, elongated members slidably passing through said cover and having their inner ends fixed to said shield and their outer ends fixed to said handle whereby outward pull upon the handle will move the shield from an extended position out of shielding relation to the supporting means and film carried thereby to an operative position enclosing the supporting means in which the flange fits tightly about the open end of the shield to exclude light when the cover is dislodged and the shield is drawn outwardly through the opening, and means carried by said box for turning spools carried by the supporting means and transferring film from one spool to another.

CLIFTON V. BERRY.